United States Patent
Chauvin

(10) Patent No.: US 9,458,826 B2
(45) Date of Patent: Oct. 4, 2016

(54) METHOD FOR CONTROLLING A WIND TURBINE BY OPTIMIZING ITS PRODUCTION WHILE MINIMIZING THE MECHANICAL IMPACT ON THE TRANSMISSION

(71) Applicant: IFP Energies nouvelles, Rueil-Malmaison (FR)

(72) Inventor: Jonathan Chauvin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 679 days.

(21) Appl. No.: 13/835,239

(22) Filed: Mar. 15, 2013

(65) Prior Publication Data
US 2013/0261819 A1    Oct. 3, 2013

(30) Foreign Application Priority Data
Mar. 20, 2012    (FR) ..................... 12 00836

(51) Int. Cl.
F03D 7/02    (2006.01)
F03D 7/04    (2006.01)

(52) U.S. Cl.
CPC ........... *F03D 7/022* (2013.01); *F03D 7/0224* (2013.01); *F03D 7/0272* (2013.01); *F03D 7/043* (2013.01); *F05B 2260/40* (2013.01); *F05B 2270/1095* (2013.01); *F05B 2270/20* (2013.01); *F05B 2270/327* (2013.01); *Y02E 10/723* (2013.01)

(58) Field of Classification Search
USPC ....................................................... 700/287
See application file for complete search history.

(56) References Cited

U.S. PATENT DOCUMENTS

| 4,193,005 A | * | 3/1980 | Kos et al. ................. 290/44 |
| 5,289,041 A | * | 2/1994 | Holley ............. F03D 7/0224 |
| | | | 290/44 |
| 2009/0212565 A1 | * | 8/2009 | Kabatzke et al. ........ 290/44 |

(Continued)

FOREIGN PATENT DOCUMENTS

EP    0 008 584    3/1980

OTHER PUBLICATIONS

Laks, J. H., et al: "Control of Wind Turbines: Past, Present, and Future", American Control Conference, 2009. ACC '09, IEEE, Piscataway, NJ, USA, Jun. 10, 2009, pp. 2096-2103, XP031487142, ISBN: 978-1-4244-4523-3.

(Continued)

*Primary Examiner* — Sean Shectman
(74) *Attorney, Agent, or Firm* — Fitch, Even, Tabin & Flannery LLP

(57) ABSTRACT

A method is disclosed for controlling a wind turbine by optimizing its production while minimizing the mechanical impact on the transmission. The wind turbine comprises a nacelle provided with a rotor on which blades are fastened and an electrical machine linked to the rotor by a transmission in which pitch angle of the blades is controlled, comprising An aerodynamic torque setpoint and an electrical machine torque setpoint making possible maximizing the recovered power are determined from measurements of wind speed, of rotor speed and of electrical machine speed. At least one of the setpoints is modified by subtracting from it a term proportional to a difference between the measured speed of the rotor and the measured speed of the electrical machine. A pitch angle of the blades making possible production of the aerodynamic torque setpoint is determined. The blades are oriented according to the angle of inclination.

12 Claims, 2 Drawing Sheets

(56) References Cited

U.S. PATENT DOCUMENTS

| | | | | |
|---|---|---|---|---|
| 2009/0295159 | A1* | 12/2009 | Johnson | F03D 7/0224 290/44 |
| 2011/0133466 | A1* | 6/2011 | Kamenov | 290/55 |
| 2012/0029892 | A1* | 2/2012 | Thulke | F03D 7/045 703/7 |
| 2013/0154263 | A1* | 6/2013 | Attia | 290/44 |
| 2013/0300125 | A1* | 11/2013 | R schoff et al. | 290/55 |
| 2015/0285222 | A1* | 10/2015 | Chauvin | F03D 17/00 290/44 |

OTHER PUBLICATIONS

Østergaard, Kasper Zinck, et al: "Gain-Scheduled Linear Quadratic Control of Wind Turbines Operating at High Wind Speed", Control Applications, 2007. CCA 2007. IEEE International Conference on, IEEE, Pl, Oct. 1, 2007, pp. 276-281, XP031164880 ISBN: 978-1-4244-0442-1.

Boukhezzar, B., et al: "Multivariable Control Strategy for Variable Speed, Variable Pitch Wind Turbines", Renewable Energy, Pergamon Press, Oxford, GB, vol. 32, No. 8, Nov. 28, 2006, pp. 1273-1287, SP005783300, iSSN: 0960-1481, DOI: 10.1016/J.RENENE.2006.06.010.

* cited by examiner

METHOD FOR CONTROLLING A WIND TURBINE BY OPTIMIZING ITS PRODUCTION WHILE MINIMIZING THE MECHANICAL IMPACT ON THE TRANSMISSION

BACKGROUND OF THE INVENTION

1. Field of the Invention

The present invention relates to the field of renewable energies and more particularly to the control of wind turbines.

2. Description of the Prior Art

A wind turbine makes possible transformation of the kinetic energy of the wind into electrical or mechanical energy. The wind turbine has the following elements:

A mast is used to place the rotor at a sufficient height to allow for its movement (necessary for the wind turbines with a horizontal axis) or to place the rotor at a height that allows it to be driven by a wind that is stronger and more regular than at ground level. The mast generally houses some of the electrical and electronic components (modulator, control, multiplying year, generator, etc.).

A nacelle mounted at the top of the mast, houses the mechanical and pneumatic components, and some of the electrical and electronic components, necessary for the operation of the machine. The nacelle can rotate to orient the machine in the right direction.

A rotor, which has blades (generally three) and the nose of the wind turbine is fastened to the nacelle. The rotor is driven by the energy of the wind and is linked by a mechanical shaft directly or indirectly (via a mechanical gearbox and shaft system) to the electrical machine (electrical generator, etc) which converts the energy collected into electrical energy.

A transmission, having two axes which are a mechanical shaft of the rotor and a mechanical shaft of the electrical machine is linked by a gearbox.

In the case of offshore wind, a distinction is made between the case where the wind turbine is placed on the seabed (fixed or established wind turbine), and the case where the wind turbine is supported by a platform which floats on the sea and which is anchored to the seabed (floating wind turbine).

Since the beginning of the 1990s, there has been an upsurge of interest in wind energy, in particular in the European Union where the annual growth rate is approximately 20%. This growth is attributed to the production of electricity without carbon emissions. In order to sustain this growth, the efficiency of the wind turbines has to continue to be improved. Wind turbines are designed to produce electricity at a price that is as low as possible. Consequently, the wind turbines are generally constructed to achieve maximum performance at approximately 15 m/s. It is in fact pointless to design wind turbines which maximize their efficiency at even higher wind speeds, since such speeds are infrequent. In the case of wind speeds greater than 15 m/s, it is necessary to lose a portion of the additional energy contained in the wind in order to avoid any damage to the wind turbine. All the wind turbines are therefore designed with a power regulation system.

Increasing wind energy production requires developing effective production tools and sophisticated control tools to enhance the performance levels of the machines. Consequently, the wind turbines are generally constructed to achieve their maximum performance at approximately 15 m/s.

Linear controllers have been widely used for the power regulation by controlling the pitch angle of the blades (orientation of the blades). Techniques that use PI and PID controllers, LQ and LQG control techniques and strategies based on robust linear controls are known.

However, the highly non-linear characteristics of the wind turbine limits the performance levels of these linear controllers. First strategies based on non-linear controls were used. See Boukhezzar B., Lupu L., Siguerdidjane H., Hand M. *"Multivariable Control Strategy for Variable Speed, Variable Pitch Wind Turbines"* Renewable Energy, 32(2007) 1273-1287.

However, none of these controllers accounts for the mechanical impact (fatigue and extreme moment) on the transmission. Most wind turbine failures are due to breakages or damage affecting the transmission. From data recovered on an offshore application, breakages of the transmission, of the gearbox or of the electrical machine represent nearly 39% of the time when the wind turbine is not producing.

SUMMARY OF THE INVENTION

The invention relates to a method for optimizing the electrical energy production of a wind turbine, by implementing a non-linear control of the orientation of the blades that accounts for the dynamics of the system, while minimizing the mechanical impact on the transmission. The impact is minimized by reducing the torsion speed variations of the transmission by accounting for the drift of the torsion angle of the transmission.

Generally, the invention relates to a method for optimizing the electrical energy production of a wind turbine comprising a nacelle provided with a rotor on which blades are fastened and an electrical machine linked to the rotor by a transmission, in which a pitch angle of the blades is controlled. The method comprises:

a) determining an aerodynamic torque setpoint and an electrical machine torque setpoint which maximizes the recovered power, from measurements of wind speed, of rotor speed and of the electrical machine speed;

b) at least one of the setpoints is modified by subtracting from it a term proportional to a difference between the measured speed of the rotor and the measured speed of the electrical machine;

c) determining a pitch angle of the blades that produces aerodynamic torque setpoint; and d) orienting the blades according to the determined pitch angle.

According to the invention, at least one of the setpoints is modified by carrying out the following steps:

i) a torque $T_{res}$ on the transmission resulting from the aerodynamic torque and electrical machine torque setpoints are determined;

ii) a resultant torque setpoint $T_{res}^{sp}$ is determined by subtracting from the resultant torque $\overline{T}_{res}$ a term proportional to the difference between the measured speed of the rotor and the measured speed of the electric machine; and iii) the aerodynamic torque setpoint is modified by dividing the resultant torque setpoint into an aerodynamic torque and an electrical machine torque.

According to the invention, the resultant torque setpoint $T_{res}^{sp}$ can be expressed as follows:

$$T_{res}^{sp} = \overline{T}_{res} k \dot{\gamma}_{tr}$$

k is strictly positive calibration parameters, and $\dot{\gamma}_{tr}$ is the speed of the torsion of the transmission, equal to a difference in speed of the rotor $\Omega_r$, and the electrical machine $\Omega_g$ related to the same axis:

$$\dot{\gamma}_{tr} = \Omega_r - \frac{1}{N}\Omega_g,$$

where N is a gear ratio between the axis of the rotor and the axis of the electrical machine.

The pitch angle of the blades can be determined by inverting an aerodynamic torque model and by using the wind speed and rotor speed measurements.

Finally, the proportional term can be determined by using a model of the dynamics of the transmission.

Other features and advantages of the method according to the invention will become apparent on reading the following description of non-limiting exemplary embodiments, by referring to the appended drawings described hereinbelow.

DETAILED DESCRIPTION OF THE INVENTION

In the description, the following notations are used:
Controlled Variables:
θ is the pitch angle of the blades in degrees, which is also called "pitch" and which corresponds to the angle of attack to the wind of each of the blades.
$T_g$ is the torque of the electric machine in Nm; and
$T_{aero}$ is the aerodynamic torque (rotational force applied to the rotor under the effect of the wind).
Measured Variables, Denoted MEAS(-):
Vw is the speed of the wind in m/s which is derived from a measurement from an anemometer or derived from an estimation;
$\Omega_r$ is the speed of the rotor in rad/s; and
$\Omega_g$ is the speed of the electric machine in rad/s.

The method according to the invention maximizes the energy production of an onshore or offshore wind turbine while limiting the extreme moments and the fatigue of the transmission. To do this, a rotor speed setpoint and an electrical machine torque setpoint are determined first to maximize the recovered power. These two setpoints are obtained by mappings which are a function of the wind speed. This type of mapping is well known.

Figure 1:
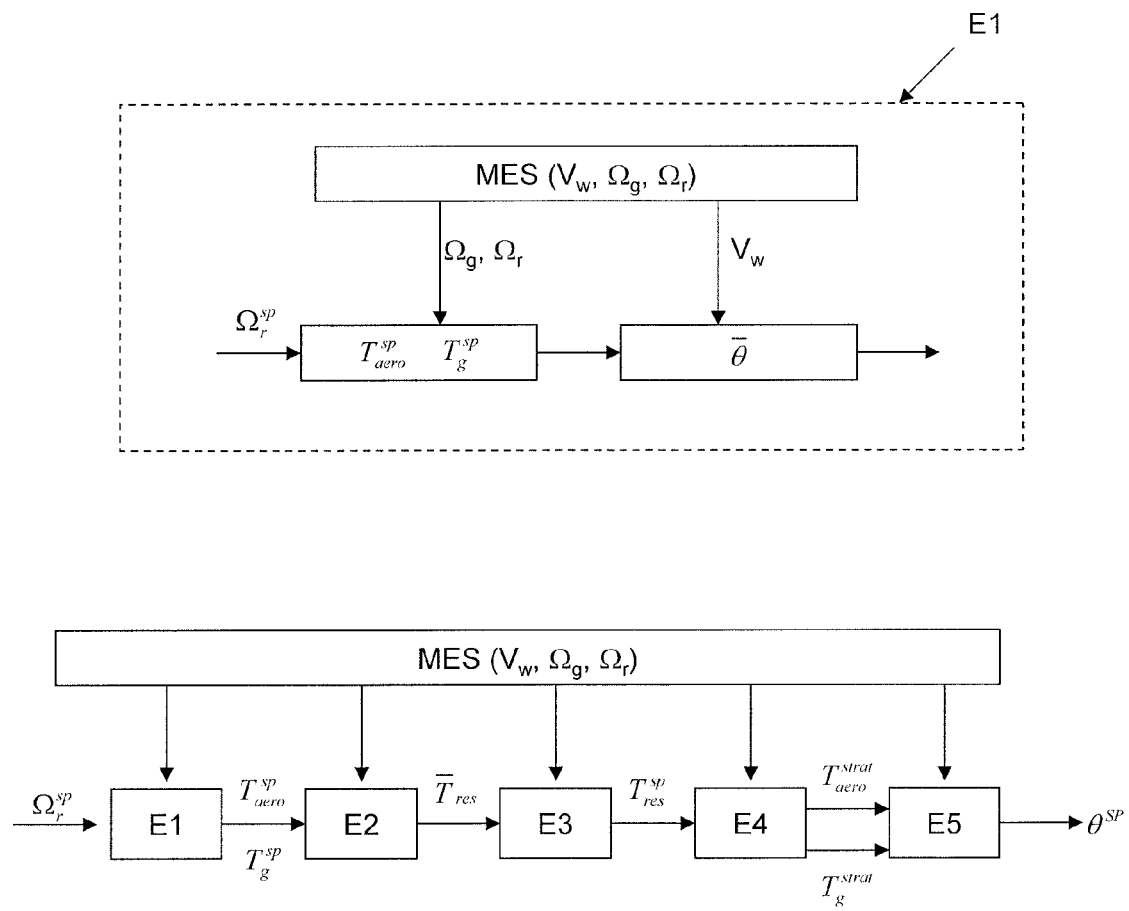
FIG. 1 represents the sequencing of the steps of the method according to the invention.

To control the mechanical structure, the aerodynamic torque applied to the hub is driven by actuating the orientation of the blades. To do this, models are used of the average aerodynamic torque, as a function of the pitch, of the wind speed and of the speed of the rotor. Then, the position setpoint of the pitch and of the torque of the electric machine are modified in order to limit the mechanical impact of the wind variations. Thus, to model driving the system, the steps illustrated in FIG. 1 are carried out:

E1. Determination of the pitch making possible optimizing the recovered power
i. Generation of an electrical torque setpoint $$T_g^{sp}$$

ii. Generation of an aerodynamic torque setpoint $$T_{aero}^{sp}$$

iii. Determination of a pitch position $\overline{\theta}$

E2. Determination of the resultant torque of the torque setpoint $$T_g^{sp}$$

and $$T_{aero}^{sp}$$

E3. Generation of a resultant torque setpoint ($T_{res}^{sp}$) which reduces the fatigue and the extreme moments of the transmission E4. Dividing up of the resultant torque setpoint ($T_{res}^{sp}$) between the aerodynamic and electrical torques E5. Determination of a pitch position which makes it possible to produce this aerodynamic torque E6. Orientation of the blades according to the determined pitch 1. Determination of the Pitch Making it Possible to Optimize the Recovered Power One aspect of the method according to the invention is to maximize the energy production of a wind turbine with a horizontal axis (propeller at right angles to the wind), installed onshore or offshore, while limiting the extreme moments and the fatigue of the mechanical structure.

To maximize the energy production of a wind turbine, the pitch angle of the blades, called "pitch" and denoted $\overline{\theta}$, that makes it possible to maximize the recovered power $P_{aero}$ as a function of the wind speed $V_w$, is sought. The orientation of the blades is the angle between the blades and a reference such as the ground (horizontal plane, at right angles to the mast of the wind turbine).

According to one embodiment, to define this angle, a model of the recoverable power is used. This power $P_{aero}$ can be expressed:

$$P_{aero} = T_{aero} * \Omega_r$$

with:
$T_{aero}$ being the aerodynamic torque (rotational force applied to the rotor under the effect of the wind);
$\Omega_r$ being the speed of the rotor in rad/s.

The angle $\overline{\theta}$ which makes it possible to maximize $P_{aero}$ is therefore sought. To do this, the following steps are carried out:

i. Generation of a torque setpoint of the electrical machine $$T_g^{sp}$$

ii. Generation of an aerodynamic torque setpoint $$T_{aero}^{sp}$$

iii. Determination of a pitch position $\bar{\theta}$ i—Generation of a Torque Setpoint of the Electric Machine $$T_g^{sp}$$

A torque setpoint of the electrical machine $$T_g^{sp}$$

is first determined. This setpoint is obtained mapping a function of the speed of the electrical machine.

According to the invention, the aerodynamic torque $T_{aero}$ is modeled by describing the power of the wind contained in a cylinder, multiplied by a factor describing the fact that a wind turbine allows only a portion of this power to be recovered. The aerodynamic torque is thus modeled as a function of the speed of the wind $V_w$, of the pitch $\theta$ and of the speed of the rotor $\Omega_r$. Such a model can thus be expressed, in steady state operation:

$$T_{aero} = 0.5\rho \Pi R_b^3 c_q\left(\theta, \frac{R_b \Omega_r}{V_w}\right) V_w^2 \quad (1)$$

With:
  $R_b$: the radius of the rotor;
  $\rho$: the density of the air;
  $c_q$: the mapping to be calibrated.

Figure 2:
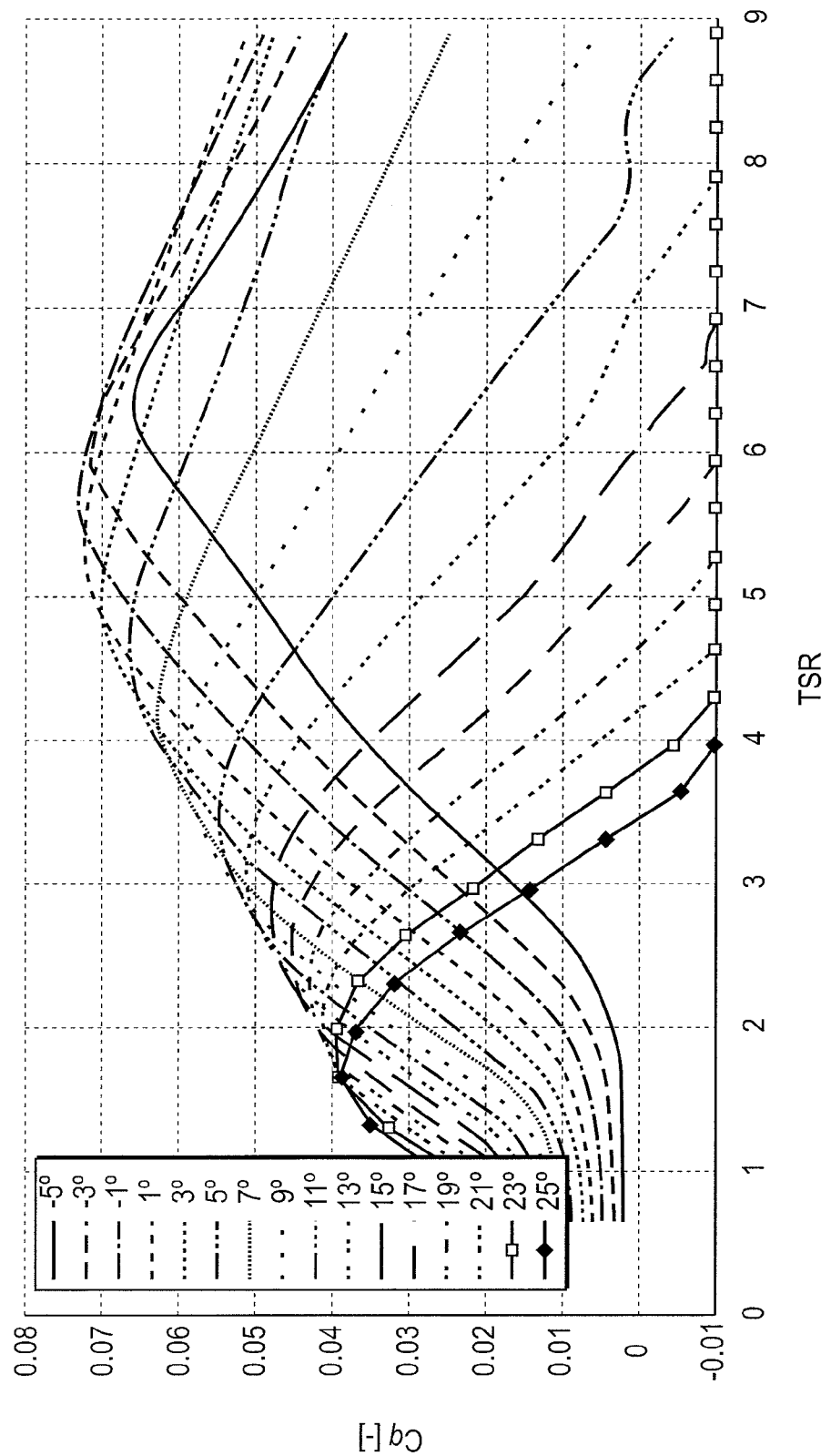
FIG. 2 illustrates an exemplary mapping of the parameter $c_q$.

An exemplary mapping of the parameter $c_q$ is presented in FIG. 2. This mapping indicates the value of the parameter $c_q$ as a function of the ratio $$\frac{R_b \Omega_r}{V_w}$$

for different pitches (one curve for each $\theta$). This type of mapping is well known. The ratio $$\frac{R_b \Omega_r}{V_w}$$

is denoted TSR in FIG. 2.

Thus, to determine the torque setpoint of the electrical machine as a function of the speed of the electrical machine, the recovered aerodynamic power is optimized for each wind speed.

$$T_g^{sp} = \arg\left(\max_{\theta, V_w} \frac{0.5}{N}\rho \Pi R_b^3 c_q\left(\theta, \frac{R_b \Omega_g}{N V_w}\right) V_w^2\right)$$

This gives the setpoint torque Tg which depends on the speed of the electrical machine: $T_g^{sp}=f(\Omega_g)$ However, compared to this reference curve, two limitations are applied:
  a zero torque for the low speeds of the electrical machine to be able to increase the speed of the wind turbine;
  a maximum torque to limit the power of the electrical machine.

Thus, there are three regions on the curve $T_g^{sp}=f(\Omega_g)$:
  Region 1: zero torque;
  Region 2: optimum torque;
  Region 3: torque limited by the maximum power.

ii—Generation of an Aerodynamic Torque Setpoint $$T_{aero}^{sp}$$

The objective is to generate an aerodynamic torque setpoint $$T_{aero}^{sp}$$

which makes it possible to produce the setpoint rotor speed $\Omega_r^{sp}$. For this, a model of the dynamics of the rotor is used.

$$J_r \frac{d\Omega_r}{dt} = T_{aero} - T_l(\Omega_r) - N T_g(\Omega_g)$$

with:
  $J_r$ being inertia of the rotor;
  $T_l(\Omega_r)$ being friction and load torque on the rotor (a second order polynomial is conventionally used);
  N being a gear ratio between the axis of the rotor and the axis of the electrical machine.

Thus, the control strategy is a dynamic control strategy which anticipates the setpoint variation and which corrects by using, a proportional term and an integral term. The strategy is expressed as:

$$T_{aero}^{sp} = T_l(\Omega_r) + nT_e(\Omega_r) + J_r \frac{d\Omega_r^{sp}}{dt} - k_p(\Omega_r - \Omega_r^{sp}) - k_i \int (\Omega_r - \Omega_r^{sp})$$

where kp and ki are two real parameters to be calibrated to guarantee the convergence of the speed toward its setpoint.

iii—Determination of a Pitch Position $\bar{\theta}$

From this aerodynamic torque setpoint $$T_{aero}^{sp},$$

a pitch angle $\bar{\theta}$ of the blades is determined which satisfies this aerodynamic torque demand $$T_{aero}^{sp}.$$

For this, the aerodynamic torque model (equation 1) is used, with the measurement of the speed of the wind $V_w$, the measurement of the speed of the rotor $\Omega_r^{sp}$, and the setpoint torque $$T_{aero}^{sp}.$$

By inverting the model (by a Newton algorithm for example), a pitch setpoint $\bar{\theta}$ is obtained:

$$\bar{\theta} = \arg\left(\min_\theta \left(T_{aero}^{sp} - 0.5\rho\Pi R_b^3 c_q\left(\theta, \frac{R_b\Omega_r}{V_w}\right)V_w^2\right)^2\right)$$

Thus, with this control law, the convergence toward the reference rotor speed is guaranteed which makes it possible to maximize the recovered power.

2—Determination of the Resultant Torque of the Torque Setpoints $$T_g^{sp}$$

and $$T_{aero}^{sp}$$

From the setpoints $$T_g^{sp}$$

and $$T_{aero}^{sp},$$

the torque $\overline{T}_{res}$ resulting from these two torques and which will bear on the transmission is determined. This torque is modelled by the following formula:

$$\overline{T}_{res} = \frac{J_g}{J_r + J_g}(T_{aero}^{sp} - T_l) + \frac{J_r}{J_r + J_g}NT_g^{sp} \quad (2)$$

wherein $J_r$ and $J_g$ are the inertias of the rotor and of the electrical machine.

3—Generation of a Resultant Torque Setpoint ($T_{res}^{sp}$) which Reduces the Fatigue and the Moments of the Transmission Efforts are made to modify this resultant torque $\overline{T}_{res}$ in order to minimize the impact on the transmission and therefore increase its life. For this, efforts are made to reduce the torsion speed variations of the transmission. Thus, efforts are made to compensate the torque with terms proportional to the difference between the speed of the rotor and of the electrical machine. The dynamics of the mechanical structure (dynamics of the transmission) can be expressed in the form of two coupled second order systems.

$$\begin{cases} \frac{J_r J_g}{J_r + J_g}\ddot{\gamma}_{tr} = -c_d\gamma_{tr} - k_d\dot{\gamma}_{tr} + \frac{J_g}{J_r + J_g}(T_{aero} - T_l) + \frac{J_r}{J_r + J_g}NT_g \\ J_g\dot{\Omega}_g = c_d\gamma_{tr} + k_d\dot{\gamma}_{tr} + N_{gb}T_g \end{cases} \quad (3)$$

where $\gamma_{tr}$, $\dot{\gamma}_{tr}$ and $\ddot{\gamma}_{tr}$ are respectively the angle, the speed and the acceleration of the torsion of the shaft. It should be noted that the torsion speed of the transmission is the difference in speed of the rotor and of the generator related to the same axis, i.e.

$$\dot{\gamma}_{tr} = \Omega_r - \frac{1}{N}\Omega_g;$$

kd is the structural damping of the transmission;
cd is the stiffness of the transmission.

Thus, the control strategy generates a resultant torque different from $\overline{T}_{res}$ to minimize the fatigue and the extreme moments of the transmission. Therefore, the relationship:

$$T_{res}^{sp} = \overline{T}_{res} - k\dot{\gamma}_{tr}$$

with k being strictly positive calibration parameters. These parameters can be determined by trial and error. It can be considered that all these parameters k are equal to 1 for example.

4—Dividing Up of the Resultant Setpoint Torque ($T_{res}^{sp}$) Between the Aerodynamic and Electrical Torques The resultant torque setpoint $T_{res}^{sp}$ is then divided up between the aerodynamic torque $T_{aero}$ and the torque of the electric machine $T_g$. For this, the dividing up is done according to operational areas. In an area 2, where the aerodynamic torque is limiting, a reserve of torque is present. In this case, the torque modification influences the torque of the electrical machine and not the aerodynamic torque. Thus, in this case, the relationship:

$$\begin{cases} T_{aero}^{strat} = T_{aero}^{sp} \\ T_g^{strat} = T_g^{sp} - k\frac{J_r + J_g}{NJ_r}\dot{\gamma}_{tr} \end{cases} \quad (4)$$

Similarly, in an area 3, where the torque of the electrical machine is limiting, the torque modification influences the aerodynamic torque which gives the relationship:

$$\begin{cases} T_{aero}^{strat} = T_{aero}^{sp} - k\frac{J_r + J_g}{J_g}\dot{\gamma}_{tr} \\ T_g^{strat} = T_g^{sp} \end{cases} \quad (5)$$

5—Determination of a Pitch Position Makes Possible Production of Other Aerodynamic Torque From the aerodynamic torque setpoint $T_{aero}^{strat}$, a pitch angle $\theta^{sp}$ of the blades is determined to satisfy this aerodynamic torque demand $T_{aero}^{strat}$. For this, the aerodynamic torque model (equation 1) is used, with the measurement of the speed of the wind $V_w$, the measurement of the speed of the rotor $\Omega_r^{sp}$, and the setpoint torque $T_{aero}^{strat}$. By inverting the model (by a Newton algorithm for example), a pitch setpoint $\theta^{SP}$ is obtained:

$$\theta^{SP} = \arg\left(\min_\theta \left(T_{aero}^{strat} - 0.5\rho\Pi R_b^3 c_q\left(\theta, \frac{R_b\Omega_r}{V_w}\right)V_w^2\right)^2\right)$$

Thus, with this control law, the convergence toward the reference rotor speed is guaranteed, making it possible to maximize the recovered power, while minimizing the mechanical impact (fatigue and extreme moment) on the transmission.

6—Orientation of the Blades According to the Determined Pitch

To optimize the electrical power recovered by the wind turbine, the blades are oriented according to the pitch angle calculated in the preceding step.

The invention claimed is:

1. A method for optimizing electrical energy production of a wind turbine, the wind turbine comprising a nacelle provided with a rotor on which blades are fastened, and an electrical machine linked to the rotor by a transmission, in which an pitch angle of the blades is controlled, comprising:
   a) determining an aerodynamic torque setpoint and an electrical machine torque setpoint used for maximizing recovered power, from measurements of wind speed, of rotor speed and of the electrical machine speed;
   b) modifying at least one of the torque setpoints by subtracting a term proportional to a difference between the measured speed of the rotor and the measured speed of the electrical machine to limit moments and fatigue on the transmission;
   c) determining a pitch angle of the blades making possible production of the aerodynamic torque setpoint; and
   d) orienting the blades according to the determined pitch angle of the blades.

2. A method according to claim 1, wherein at least one of the setpoints is modified by:
   i) determining a torque on the transmission resulting from the aerodynamic torque and the electrical machine torque setpoints;
   ii) determining a resultant torque setpoint by subtracting from the resultant torque a term proportional to a difference between the measured speed of the rotor and the measured speed of the electrical machine; and
   iii) modifying aerodynamic torque setpoint by dividing the resultant torque setpoint into an aerodynamic torque and an electrical machine torque.

3. A method according to claim 2, in which the resultant torque setpoint $T_{res}^{sp}$ is expressed as:

$$T_{res}^{sp} = \overline{T}_{res} - k\dot{\gamma}_{tr}$$

with k being strictly positive calibration parameters, with $T_{res}$ being the resultant torque, and $\dot{\gamma}_{tr}$ being a speed of torsion of the transmission, equal to a difference in speed of the rotor $\Omega_r$, and of the electrical machine $\Omega_g$ related to one axis with $$\dot{\gamma}_{tr} = \Omega_r - \frac{1}{N}\Omega_g,$$

where N is a gear ratio between an axis of the rotor and an axis of the electrical machine.

4. A method according to claim 1, in which the pitch angle of the blades is determined by inverting an aerodynamic torque model while using the wind speed and rotor speed measurements.

5. A method according to claim 2, in which the pitch angle of the blades is determined by inverting an aerodynamic torque model while using the wind speed and rotor speed measurements.

6. A method according to claim 3, in which the pitch angle of the blades is determined by inverting an aerodynamic torque model while using the wind speed and rotor speed measurements.

7. A method according to claim 1, in which the proportional term is determined by using a model of dynamics of the transmission.

8. A method according to claim 2, in which the proportional term is determined by using a model of dynamics of the transmission.

9. A method according to claim 3, in which the proportional term is determined by using a model of dynamics of the transmission.

10. A method according to claim 4, in which the proportional term is determined by using a model of dynamics of the transmission.

11. A method according to claim 5, in which the proportional term is determined by using a model of dynamics of the transmission.

12. A method according to claim 6, in which the proportional term is determined by using a model of dynamics of the transmission.

* * * * *